US009280231B2

(12) United States Patent
Small et al.

(10) Patent No.: US 9,280,231 B2
(45) Date of Patent: Mar. 8, 2016

(54) DISABLING DISPLAY LINES DURING INPUT SENSING PERIODS

(71) Applicant: Synaptics Incorporated, Santa Clara, CA (US)

(72) Inventors: Jeffrey A. Small, Rochester, NY (US); Petr Shepelev, San Jose, CA (US); Christopher Ludden, Pittsford, NY (US); Thomas Mackin, Rochester, NY (US); Stephen Morein, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 313 days.

(21) Appl. No.: 13/828,010

(22) Filed: Mar. 14, 2013

(65) Prior Publication Data
US 2013/0342481 A1 Dec. 26, 2013

Related U.S. Application Data

(60) Provisional application No. 61/662,340, filed on Jun. 20, 2012.

(51) Int. Cl.
G06F 3/041 (2006.01)

(52) U.S. Cl.
CPC ............ G06F 3/0416 (2013.01); G06F 3/0412 (2013.01)

(58) Field of Classification Search
CPC ............................ G06F 3/0416; G06F 3/0412
USPC ................. 345/173–174; 178/18.01–18.07
See application file for complete search history.

(56) References Cited

U.S. PATENT DOCUMENTS

| | | |
|---|---|---|
| 5,534,892 A | 7/1996 | Tagawa |
| 5,896,120 A | 4/1999 | Iguchi et al. |
| 6,239,788 B1 | 5/2001 | Nohno et al. |
| 2004/0217945 A1 | 11/2004 | Miyamoto et al. |
| 2006/0012575 A1 | 1/2006 | Knapp et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2010/0001973 A1 | 1/2010 | Hotelling et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2011/0050585 A1 | 3/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0267305 A1 | 11/2011 | Shahparnia et al. |
| 2012/0050217 A1* | 3/2012 | Noguchi et al. ............. 345/174 |

* cited by examiner

*Primary Examiner* — Rodney Amadiz
(74) *Attorney, Agent, or Firm* — Patterson + Sheridan, LLP

(57) ABSTRACT

Embodiments of the present invention generally provide a processing system for a display device having an integrated sensing device. The processing system includes a driver module coupled to a plurality of transmitter electrodes. Each transmitter electrode includes one or more common electrodes configured for display updating and input sensing. The driver module is configured for selecting a first display line set for display updating during a first display update period and driving the first display line set for display updating during the first display update period. The driver module is further configured for driving one or more transmitter electrodes of the plurality of transmitter electrodes for input sensing during a non-display update period and selecting a second display line set for display updating during a restart period.

20 Claims, 10 Drawing Sheets

DISABLING DISPLAY LINES DURING INPUT SENSING PERIODS

CROSS-REFERENCE TO RELATED APPLICATIONS

This application claims benefit of U.S. Provisional Patent Application Ser. No. 61/662,340, filed Jun. 20, 2012, which is herein incorporated by reference in its entirety.

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for both updating display lines and transmitting input sensing signals. In such shared electrode configurations, display updating and input sensing may be performed during separate time periods in order to reduce the likelihood of interference between these processes. For example, transmitting input sensing signals while updating display lines may generate display artifacts. Similarly, driving shared electrodes to update the display while performing input sensing may corrupt acquired sensing data. However, in many types of display devices (e.g., slow-switching transistor devices), display updating is continuous, and there are no "quiet" periods during which input sensing can be performed.

Therefore, there is a need for a system and method for generating quiet periods during which input sensing can be performed with shared electrode devices.

SUMMARY OF THE INVENTION

Embodiments of the present invention generally provide a processing system for a display device having an integrated sensing device. The processing system includes a driver module and a receiver module. The driver module includes driver circuitry. The driver module is coupled to a plurality of transmitter electrodes, each transmitter electrode including one or more common electrodes of a plurality of common electrodes configured for display updating and input sensing. The driver module is configured for selecting a first display line set for display updating during a first display update period of a first display frame, and driving the first display line set for display updating during the first display update period. The driver module is further configured for driving one or more transmitter electrodes of the plurality of transmitter electrodes for input sensing during a non-display update period. The non-display update period occurs after the first display update period and before a second display update period of the first display frame. The driver module is further configured for selecting a second display line set for display updating during a restart period. The receiver module is coupled to a plurality of receiver electrodes and configured for receiving resulting signals with the plurality of receiver electrodes when the one or more transmitter electrodes are driven for input sensing.

Embodiments of the present invention further provide an input device including a display device having an integrated sensing device. The input device includes a plurality of transmitter electrodes, a plurality of receiver electrodes, and a processing system. Each transmitter electrode includes one or more common electrodes of a plurality of common electrodes configured for display updating and input sensing. The processing system is coupled to the plurality of common electrodes and the plurality of receiver electrodes. The processing system is configured to select a first display line set for display updating during a first display update period of a first display frame, and drive the first display line set for display updating during the first display update period. The processing system is further configured to drive one or more transmitter electrodes of the plurality of transmitter electrodes for input sensing during a non-display update period. The non-display update period occurs after the first display update period and before a second display update period of the first display frame. The processing system is further configured to receive resulting signals with the plurality of receiver electrodes when the one or more transmitter electrodes are driven for input sensing. The processing system is further configured to select a second display line set for display updating during a restart period.

Embodiments of the present invention further provide a method of input sensing with a display device integrated with a sensing device having a plurality of receiver electrodes and a plurality of transmitter electrodes. Each transmitter electrode includes one or more common electrodes of a plurality of common electrodes. The method includes selecting a first display line set for display updating during a first display update period of a first display frame. The method further includes driving the first display line set for display updating during the first display update period. The method further includes driving one or more transmitter electrodes of the plurality of transmitter electrodes for input sensing during a non-display update period. The non-display update period occurs after the first display update period and before a second display update period of the first display frame. The method further includes receiving resulting signals with the plurality of receiver electrodes when the one or more transmitter electrodes are driven for input sensing. The method further includes selecting a second display line set for display updating during a restart period.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for disabling the process of display updating to generate non-display update time periods during which input sensing can be performed. After input sensing is complete, display updating may be resumed by selecting additional display lines for updating during a restart period. In various embodiments, non-display update periods may be implemented using software code and/or hardware logic. Advantageously, the system and method described herein enable non-display update periods to be generated using a relatively small amount of additional circuitry and/or hardware logic.

Figure 1:
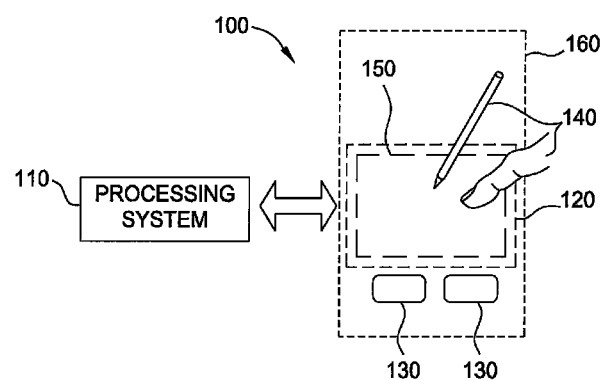
FIG. 1 is a block diagram of an exemplary input device in accordance with embodiments of the invention.

Turning now to the figures. FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I$^2$C. SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrode. In addition, other display elements, such as source drivers, gate select lines, storage capacitors, and the like, may be used to perform capacitive sensing.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
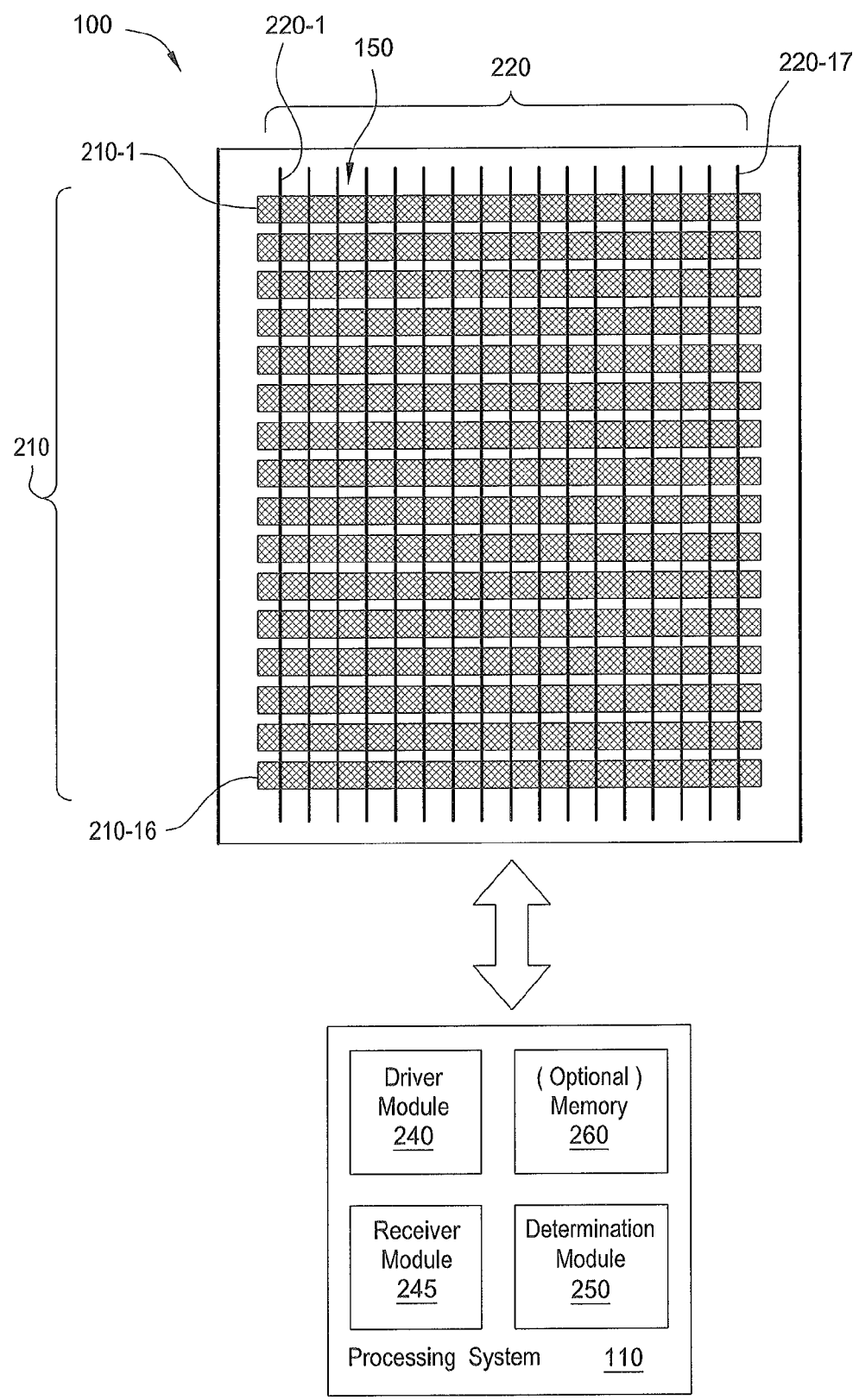
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes. Additionally, in various embodiments, each receiver electrode 220 may comprise one or more common electrodes. The processing system 110 is coupled to the array of sensing elements 150, for example, through one or more routing traces.

Although the processing system 110 is illustrated in FIG. 2 embodied as a single integrated circuit (IC), the input device 100 may include any appropriate number of ICs comprising the processing system 110. As shown in FIG. 2, the processing system 110 may include a driver module 240, a receiver module 245, a determination module 250, an optional memory 260, and/or a synchronization mechanism (not shown in FIG. 2).

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage.

The driver module 240, which includes driver circuitry, may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes to update one or more display lines of the display screen. In addition, the processing system 110 is configured to operate the common electrodes as transmitter electrodes for input sensing by driving transmitter signals onto the common electrodes.

The functions of the processing system 110 may be implemented in more than one IC to control the display module elements (e.g., common electrodes) and drive transmitter signals and/or receive resulting signals received from the array of sensing elements 150. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Input Sensing During Non-Display Update Periods

In various embodiments, the common electrodes and/or other display elements (e.g., gate select lines, source lines, storage capacitors, etc.) may be used both to update the display and to perform input sensing. In order to reduce the likelihood of interference between these processes, display updating and input sensing may be performed during separate time periods.

In one example, input sensing may be performed during non-display update periods (e.g., sensing periods, input sensing periods or capacitive sensing periods) referred to as "blanking" periods or "distributed blanking" periods. These non-display update periods, also referred to as horizontal-blanking periods, long horizontal-blanking ("long h-blank") periods, vertical-blanking periods, in-frame blanking periods, etc., occur between display line and/or display frame updates. For example, a horizontal-blanking period may refer to the non-display update period that occurs after updating display line N, but before updating display line N+1, during which the display elements may be altered to update display line N+1. Additionally, if a video signal transmitted to the display device 160 is field-interlaced, input sensing may be performed between successive fields. Further, a long horizontal-blanking period may be generated by redistributing multiple horizontal-blanking periods, at least a portion of the vertical blanking periods, or some combination of the two, and combining the periods into a single non-display update period. For example, a long horizontal-blanking period may be generated by removing the non-display update periods that may occur between multiple display line updates and combining the non-display update periods into a single non-display update period. In one embodiment, a long horizontal-blanking period (or a sensing period) may be a non-display update period that is at least as long as the duration of a display line update period. In another embodiment, a long horizontal-blanking period may be a non-display update period (or a sensing period) that is longer than the duration of a display line update period.

Sensing periods may be implemented with various types of display devices. For example, fast-switching transistor displays enable display lines to be selected and updated relatively quickly, allowing display updating to be stopped to perform input sensing and subsequently resumed in an efficient manner. In contrast, slow-switching transistor displays may experience a time delay between the time at which a display line is selected and the time at which the corresponding row of transistors reaches a sufficient level (e.g., $V_{on}$) to receive pixel data. In one embodiment, a slow-switching transistor is any type of transistor that, when utilized in a gate select line for a display line, does not fully "open" or "activate" when the source lines are driven to update the display line. One exemplary type of slow-switching transistor is amorphous silicon or "a-Si" transistors. One exemplary type of fast-switching transistor is low-temperature polycrystalline silicon (LTPS) transistors. In some embodiments, a fast-switching transistor in one display device may be considered a slow-switching transistor in another display device. The voltage-time behavior of an exemplary slow-switching transistor is shown in FIG. 3A, discussed below.

To compensate for switching delays and enable slow-switching devices to perform at a desired resolution and refresh rate, such devices may use a technique referred to as "pipelining," in which several consecutive gate select lines are driven in an overlapping manner. However, due to the overlapping nature of the gate select signals, there may be no period of time during which display lines are not selected and, thus, no blanking periods for performing input sensing. Consequently, implementing sensing periods with display devices that utilize slow-switching transistors presents a unique set of challenges.

Figure 3A:
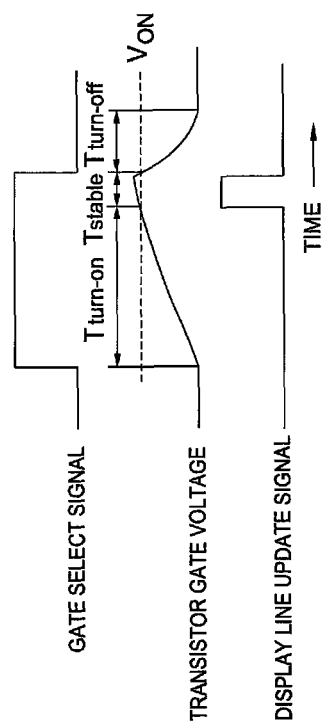
FIGS. 3A and 3B illustrate the voltages of slow-switching transistors as a function of time in accordance with embodiments of the invention.
Figure 3B:
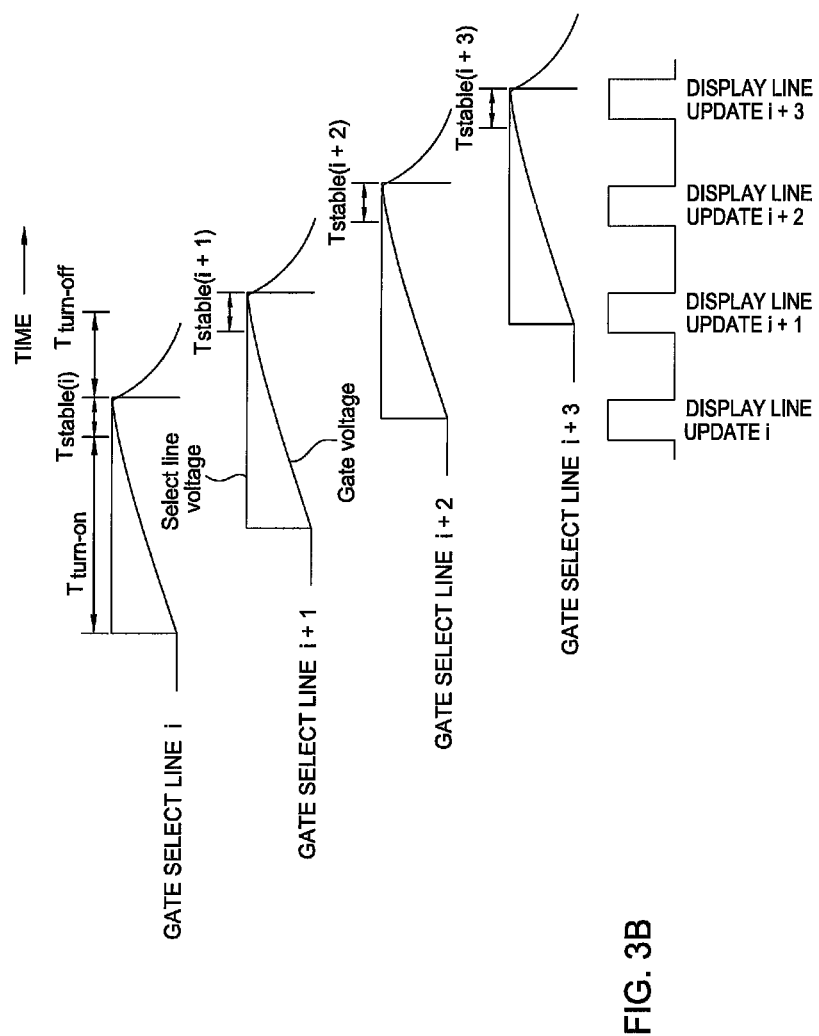

FIGS. 3A and 3B illustrate the voltages of slow-switching transistors as a function of time in accordance with embodiments of the invention. As shown, a time delay ($T_{turn-on}$) is associated with switching a transistor gate from a 'closed' state to an 'open' state. Once the gate reaches a threshold voltage ($V_{ON}$), the transistor enters an 'open' state for a time period $T_{stable}$, during which one or more sub-pixels associated with the transistor may be driven for display updating. In one embodiment, $T_{stable}$ is less than or equal to the time allotted to update each display line ($T_{update}$) of a display device having a particular refresh rate and resolution. Once the one or more sub-pixels have been updated, the gate select line associated with the transistor may be deselected, after which the transistor enters a 'closed' state.

In order to compensate for the time delay between the time at which the gate select line is first driven with a gate select signal and the time at which the gate voltage reaches a turn-on voltage, multiple gate select lines, each associated with one or more display lines, may be "pipelined." That is, the select lines may be driven in a sequential and overlapping manner such that that the transistors corresponding to the display lines reach an 'on' state at different times, enabling each display line to be separately updated (e.g., via source lines) in a timely manner. One embodiment of this technique is illustrated in FIG. 3B. As shown in FIG. 3B, two or more gate select lines (e.g., line i and line i+1) may be driven in an overlapping manner such that the transistor(s) associated with each gate select line reach $V_{ON}$ at a different time (e.g., reach $V_{ON}$ in a desired sequence). The number of display lines N selected at the same time may be determined from Equation 1, shown below. The display update signals (e.g., pixel values) driven to the source lines then may be synchronized such that the display line(s) associated with each gate select line are updated in a sequential manner.

$$N = \text{ceiling}\left(\frac{T_{turn\text{-}on} + T_{stable} + T_{close}}{T_{update}}\right) \qquad \text{(Eq. 1)}$$

If input sensing is performed only during each vertical blanking period, such that the process of pipelining is not interrupted, input sensing data may be collected at a rate equal to the display refresh rate. In order to acquire input sensing data at a different rate (e.g. a higher rate), the pipelining process may be interrupted, as shown in FIG. 4, discussed below.

Disabling Display Lines During Input Sensing Periods

Figure 4:
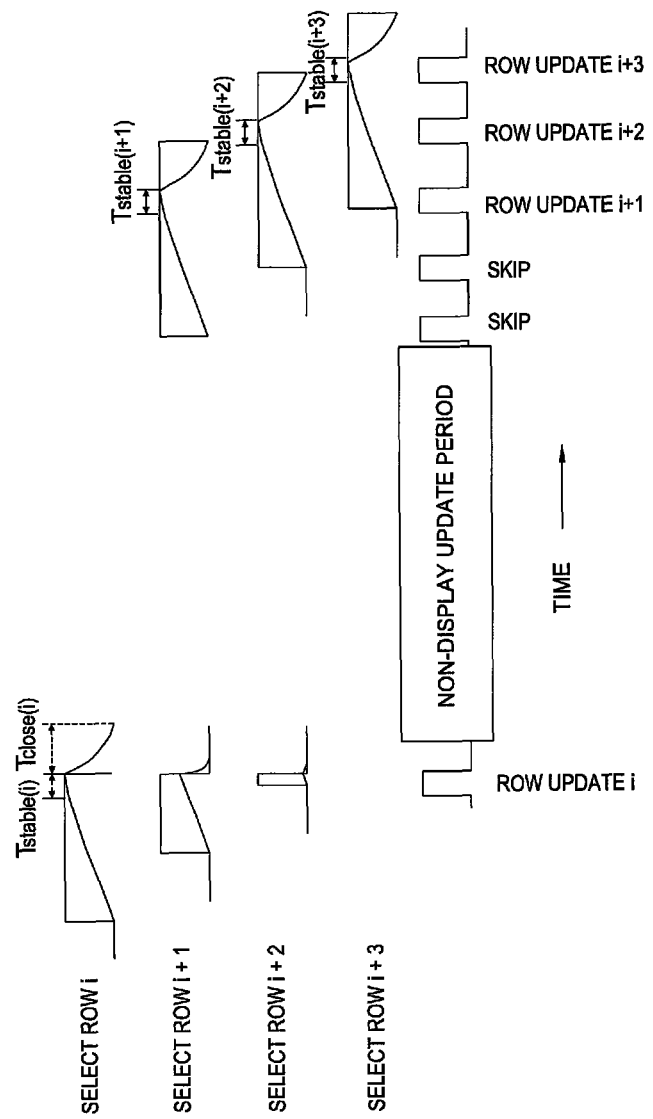
FIG. 4 illustrates a technique for performing input sensing during a non-display update period with a slow-switching display device in accordance with embodiments of the invention.

FIG. 4 illustrates a technique for performing input sensing during a non-display update period with a slow-switching display device (e.g., display device 160) in accordance with embodiments of the invention. Each select line may be driven to select a particular display line (e.g., a row of pixels) for updating. An entire row of pixels may be selected for updating by a single select line. Once a display line is selected, pixel data is driven to the pixels associated with the selected display line through a plurality of source lines driven with source line data to update the display line. After the display line is updated, the display line is deselected, the next display line is selected, and pixel data associated with the next display line is driven to the next row of pixels through the source lines. This process is repeated until every line in the display device 160 has been updated.

As discussed above, the non-display update periods which may occur after each display line update may be redistributed and/or combined to form sensing periods. During the sensing period, display updating is stopped, and input sensing may be performed. After the sensing period, display updating may resume, for example, by sequentially selecting and driving additional display lines (e.g., lines 5, 6, 7, etc.) for updating.

As shown in FIG. 4, the process of selecting and updating display lines may be interrupted, for example, at or near the end of a $T_{close}$ period. One or more transmitter electrodes 210 then may be operated for input sensing during the non-display update period (e.g., sensing period). Additionally, one or more of the gate select lines that were driven with a select signal prior to the sensing period (and/or would have been driven with a select signal during the sensing period) may be driven with a reference voltage (e.g., $V_{COM}$, ground, a gray-level voltage, etc.) or coupled to a high-impedance circuit (e.g., electrically floated) during at least a portion of the sensing period.

After the sensing period, the pipelining process may be resumed starting with the next display line (e.g., line i+1 in FIG. 4) during a restart period. During the restart period, the updating of one or more display line updates may be skipped until the transistor(s) associated with the next display line reach $V_{ON}$. Thus, for each sensing period, resuming the pipelining process may introduce an overhead time. In one embodiment, display line updates may be skipped for a time period substantially equal to $T_{turn\text{-}on}$. Once the transistor(s) associated with a gate select line reach $V_{ON}$, display updating may resume, and the corresponding display line (e.g., display line i+1 in FIG. 4) may be updated. Optionally, during the restart period, the source lines may be driven with a reference voltage (e.g., ground, $V_{COM}$, gray-level voltage, etc.) or coupled to a high-impedance circuit. Further, if pixel-inversion techniques are used, the non-inverted pixels may be driven to a different voltage, such as a gray-level voltage.

The processing system 110 of the input device 100 may be configured to interrupt the process of updating the display device 160 to perform input sensing during a non-display update period. For example, the techniques described above with respect to FIGS. 3A, 3B and 4 may be implemented in software code, firmware code, etc. Additionally, the techniques herein may be implemented in hardware logic, for example, with one or more transistor devices, storage devices, etc., as described below with respect to FIGS. 5A-7.

Figure 5A:
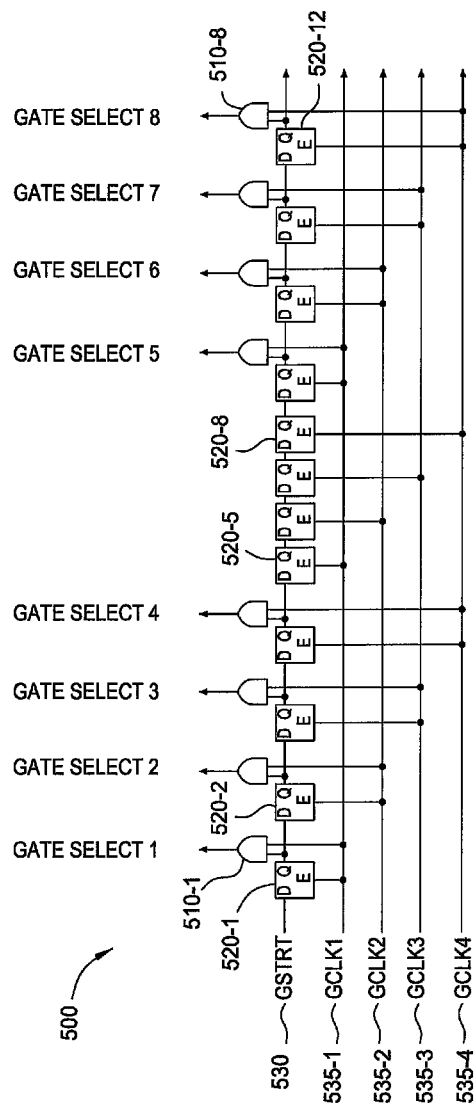
FIG. 5A illustrates first transistor logic for generating a non-display update period with the input device in accordance with embodiments of the invention.

FIG. 5A illustrates transistor logic 500 for generating a non-display update period with the input device 100 in accordance with embodiments of the invention. Although the following techniques are described with respect to specific types of logic elements (e.g., a shift register including AND gates and flip-flops), these techniques may be implemented with other types of transistors, gates, latches, registers, etc. having similar or equivalent configurations.

As shown in FIG. 5A, each gate select line may be coupled to a logic gate 510 (e.g., 510-1, 510-2, 510-3, etc.). A latch 520 (e.g., 520-2) may be disposed between each logic gate 510. The logic gates 510 and latches 520 may be in communication with a plurality of control lines (e.g., start line 530 and clock lines 535-1, 535-2, etc.) coupled to the processing system 110 and configured to clock a token through the transistor logic 500. A clock line 535 and the output of a latch 520 may be coupled to each logic gate 510 to control the pulse width of the select signal outputted to each gate select line. A clock signal may be asserted on each clock line 535 for a duration equal to the time period of one display line update. The clock signals may be asserted in a sequential and overlapping manner, as described below in further detail with respect to FIG. 5B.

The transistor logic 500 further includes a series of latches 520 (e.g., 520-5 through 520-8) configured to hold the token during a non-display update period, during which input sensing may be performed. The logic elements may be disposed on any appropriate layer or substrate of the input device 100. For example, in various embodiments, the logic elements may be fabricated on a thin-film transistor (TFT) layer of the display device 160. Further, the logic elements may be interleaved on one edge of a layer of the display device 160, or the logic elements may be disposed on two or more edges (e.g., two opposing edges) and interleaved between the two or more edges. The number of logic elements may depend on the display resolution and refresh rate of the display device 160. In one embodiment, logic elements configured to hold the token during non-display update periods may be disposed on the display device 160 approximately every 4 to 5 millimeters or once for approximately every 40 display lines.

In one embodiment, the token may be four line periods wide, and the transistor logic 500 may include a series of four adjacent latches 520 (e.g., 520-5 through 520-8) configured to hold the token during the non-display update period. The number of latches 520 configured to hold the token, also referred to as "dummy" latches or dummy registers, may be equal to the number of clock lines 535. Advantageously, this dummy register configuration does not require additional control routing, reducing the number of traces within the input device 100. Moreover, the dummy registers do not include large buffers, since they do not drive gate select lines. Thus, the dummy registers can be disposed on a relatively small surface area.

Figure 5B:
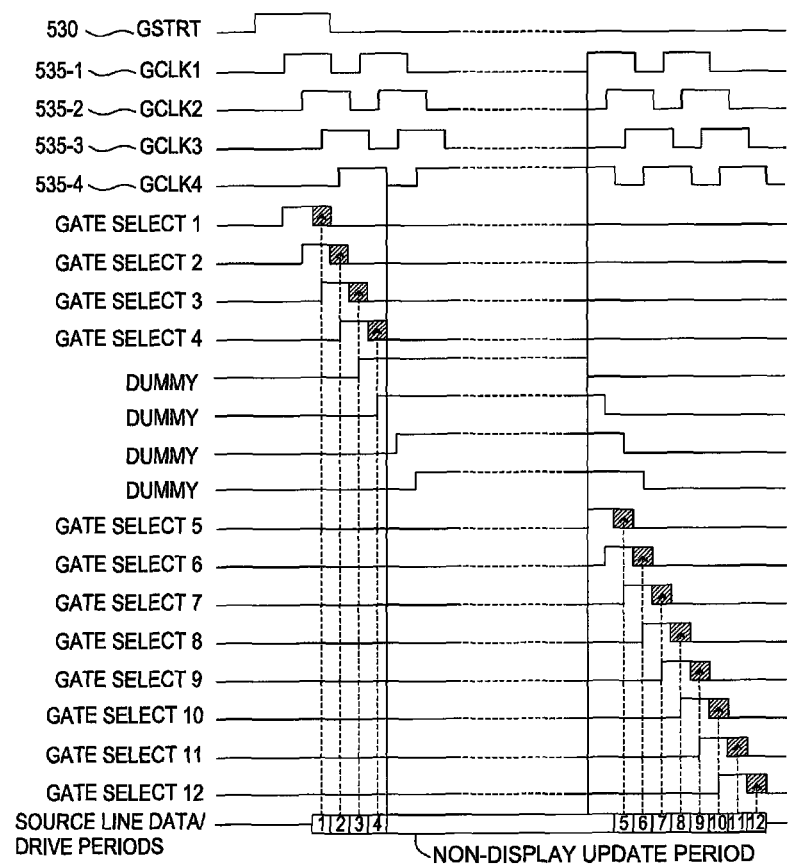
FIG. 5B illustrates waveforms of the first transistor logic during display update periods and non-display update periods in accordance with embodiments of the invention.

FIG. 5B illustrates waveforms of the transistor logic 500 during display update periods and non-display update periods in accordance with embodiments of the invention. As shown in FIG. 5B, a start signal may be asserted on start line 530. Clock signals then may be asserted on clock lines 535-1, 535-2, 535-3, etc. in order to clock the token through the transistor logic 500 and drive select signals to the gate select lines in a pipelined manner. When the transistors associated with each gate select line reach $V_{ON}$, source line data (e.g., pixel data) for the corresponding display line may be driven to the source lines. Source line data may be driven in a sequential manner (e.g., display line 1, display line 2, etc.), as shown in FIG. 5B. After pixel data for display line 4 has been driven to the source lines, gate select line 4 may be deselected, and the token may be held by the dummy registers (i.e., latches 520-5 through 520-8) during the non-display update period (e.g., sensing period). In one embodiment, when the token is held by the dummy registers, no select lines are enabled, and input sensing may be performed. After the non-display update period (e.g., after input sensing is complete), a clock signal may be asserted on clock line 535-1, and the token may be clocked through the transistor logic 500 to drive gate select lines associated with display lines 5-12.

Although the transistor logic 500 illustrated in FIG. 5A is described with respect to a slow-switching display device, the configurations and techniques described above also may be implemented with other display types (e.g., fast-switching display devices).

Figure 6A:
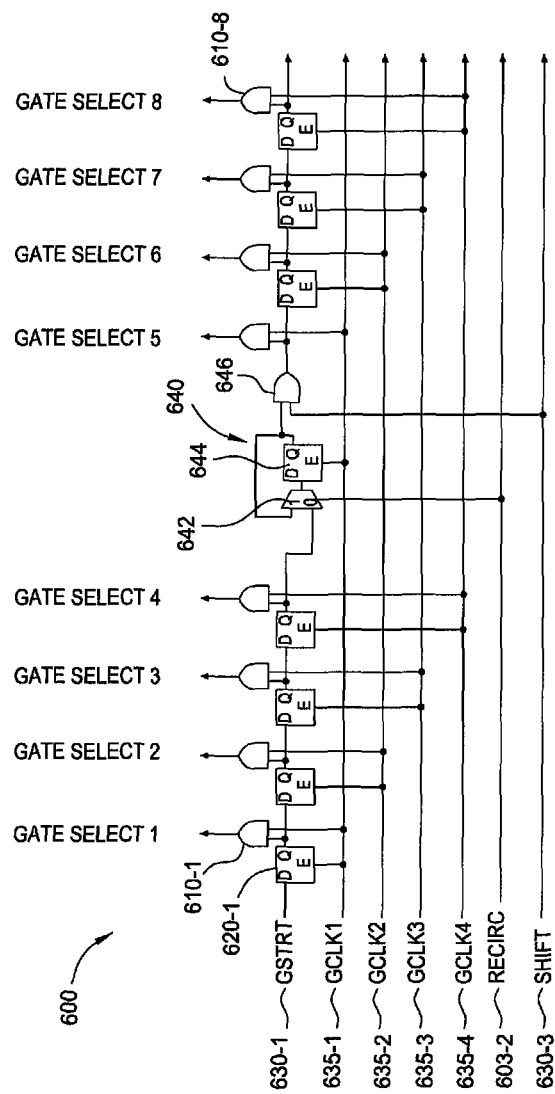
FIG. 6A illustrates second transistor logic for generating a non-display update period with the input device in accordance with embodiments of the invention.

FIG. 6A illustrates transistor logic 600 for generating a non-display update period with the input device 100 in accordance with embodiments of the invention. Although the following techniques are described with respect to specific types of logic elements (e.g., a shift register including AND gates, flip-flops, and a multiplexer), these techniques may be implemented with other types of transistors, gates, latches, registers, etc. having similar or equivalent configurations.

As shown in FIG. 6A, each gate select line may be coupled to a logic gate 610 (e.g., 610-1, 610-2, 610-3, etc.). A latch 620 (e.g., 620-2) may be disposed between each logic gate 610. The logic gates 610 and latches 620 may be in communication with a plurality of control lines (e.g., start line 630-1, recirculate line 630-2, shift line 630-3, and clock lines 635-1, 635-2, etc.) coupled to the processing system 110 and configured to clock a token through the transistor logic 600. A clock line 635 and the output of a latch 620 may be coupled to each logic gate 610 to control the pulse width of the select signal outputted to each gate select line. A clock signal may be asserted on each clock line 635 for a duration equal to the time period of one display line update. The clock signals may be asserted in a sequential and overlapping manner, as described below in further detail with respect to FIG. 6B.

The transistor logic 600 further includes delay logic 640, including, for example, a multiplexer 642, a latch 644, and a logic gate 646 (e.g., an AND gate), configured to hold the token during a non-display update period. The logic elements may be disposed in the input device 100 as described above with respect to FIG. 5A. Advantageously, the delay logic 640 can be disposed on a relatively small surface area within the input device 100.

Figure 6B:
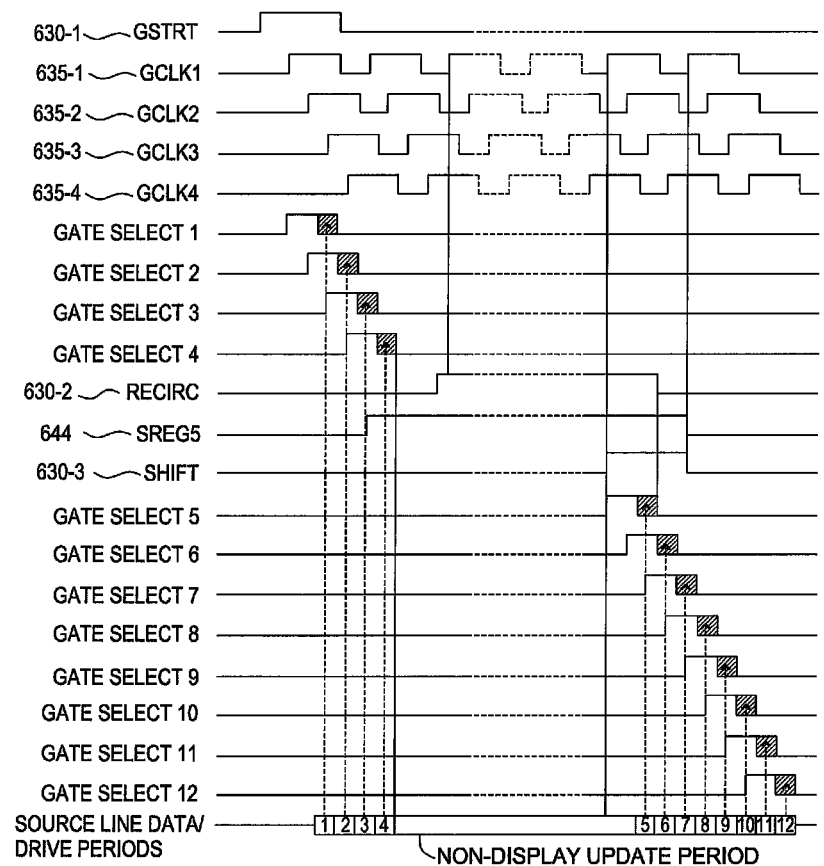
FIG. 6B illustrates waveforms of the second transistor logic during display update periods and non-display update periods in accordance with embodiments of the invention.

FIG. 6B illustrates waveforms during display update periods and non-display update periods with the transistor logic 600 in accordance with embodiments of the invention. As shown in FIG. 6B, a start signal may be asserted on start line 630-1. Clock signals then may be asserted on clock lines 635-1, 635-2, 635-3, etc. in order to clock the token through the transistor logic 600 and drive select signals to the gate select lines in a pipelined manner. When the transistors associated with each gate select line reach $V_{ON}$, source line data (e.g., pixel data) for the corresponding display line may be driven to the source lines. Source line data may be driven in a sequential manner (e.g., display line 1, display line 2, etc.), as shown in FIG. 6B.

After pixel data for display line 4 has been driven to the source lines, gate select line 4 may be deselected, and the token may be held by the delay logic 640 during the non-display update period (e.g., sensing period). For example, as shown in FIG. 6B, once a clock signal is asserted on clock line 635-4, the token is clocked to the delay logic 640. Next, a clock signal is asserted on clock line 635-1, and the token is clocked to the logic gate 646. Then, a recirculate signal is driven to the recirculate line 630-2, switching the multiplexer 642 such that each subsequent clock signal asserted on the clock line 635-1 causes the latch 644 to recirculate the token between the latch input and the latch output.

The delay logic 640 may hold the token until the recirculate signal is terminated. The token then may be shifted to the logic gate 610-5 associated with gate select line 5 by driving the shift line 630-3 with a shift signal, after which the token may be clocked through the transistor logic 600 to drive gate select lines associated with display lines 5-12. In one embodiment, when the token is held by the delay logic 640, no select lines are enabled, and input sensing may be performed.

Although the transistor logic 600 illustrated in FIG. 6A is described with respect to a slow-switching display device, the configurations and techniques described above also may be implemented with other display types (e.g., fast-switching display devices).

Figure 7:
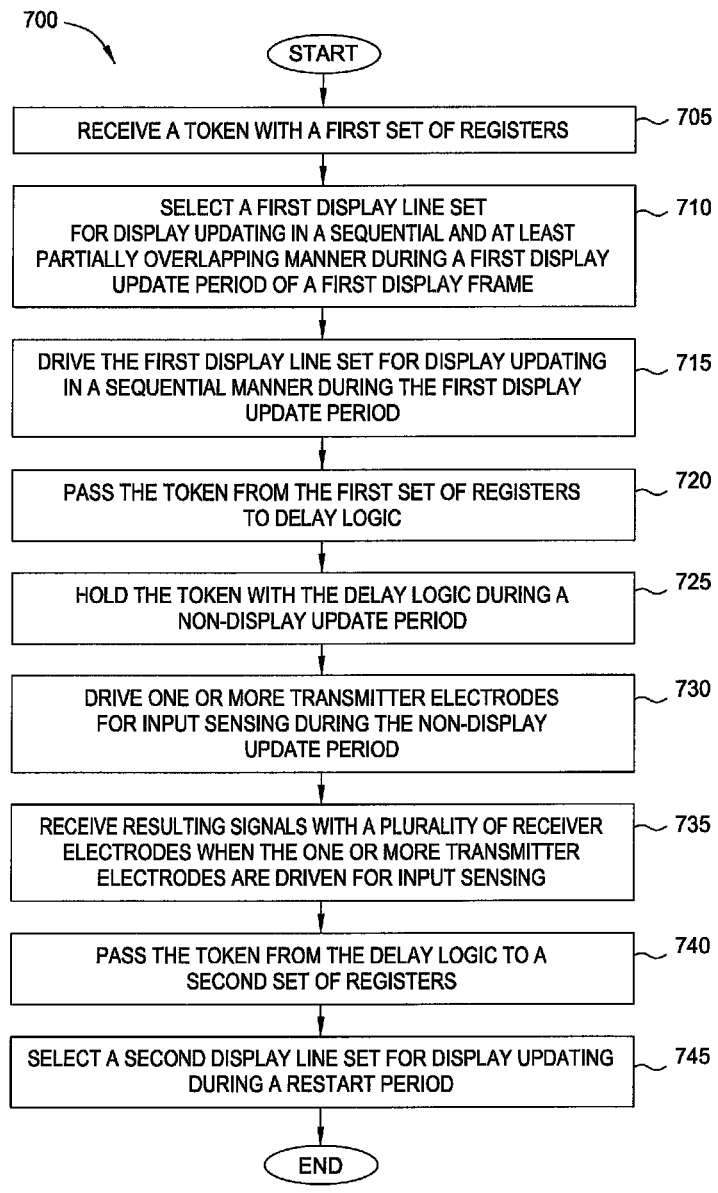
FIG. 7 is a flow chart of a method for generating a non-display update period with the input device in accordance with embodiments of the invention.

FIG. 7 is a flow chart of a method 700 for generating a non-display update period with the input device 100 in accordance with embodiments of the invention. Although the method 700 is described in conjunction with FIGS. 1-6B, persons skilled in the art will understand that any system configured to perform the method, in any appropriate order, falls within the scope of the present invention.

The method 700 begins at step 705, where a token is received with a first set of registers (e.g., 520-1 through 520-4 or 620-1 through 620-4). In response to receiving the token with the first set of registers, at step 710, a first display line set is selected for display updating (e.g., in a sequential and overlapping or "pipelined" manner) during a first display period of a first display frame. At step 715, the first display line set is driven for display updating (e.g., in a sequential manner) during the first display update period.

Next, at step 720, the token is passed from the first set of registers to delay logic (e.g., registers 520-5 through 520-8 or delay logic 640). At step 725, the token is held by the delay logic during a non-display update period. Then, at step 730, one or more transmitter electrodes 210 are driven for input sensing during the non-display update period. At step 735, resulting signals are received with the receiver electrodes 220 when the transmitter electrodes 210 are driven for input sensing. The resulting signals may be utilized to detect the presence (or absence) of an input object 140 in the sensing region 120. At step 740, the token is passed from the delay logic to a second set of registers (e.g., registers 520-9 through 520-12 or 620-5 through 620-7. Finally, at step 745, a second display line set is selected for display updating during a restart period. For example, the second display line set may be selected for updating as the token is passed between the second set of registers during the restart period.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for a display device having an integrated sensing device, the processing system comprising:
   a driver module comprising driver circuitry, the driver module coupled to a plurality of transmitter electrodes, each transmitter electrode comprising one or more common electrodes of a plurality of common electrodes configured for display updating and input sensing, the driver module configured for:
      selecting a first display line set for display updating during a first display update period of a first display frame;
      driving the first display line set for display updating during the first display update period;
      driving one or more transmitter electrodes of the plurality of transmitter electrodes for input sensing during a non-display update period, wherein the non-display update period occurs after the first display update period and before a second display update period of the first display frame; and
      selecting a second display line set for display updating during a restart period, wherein one or more display line updates for the second display line set are skipped during at least a portion of the restart period; and
   a receiver module coupled to a plurality of receiver electrodes and configured for receiving resulting signals with the plurality of receiver electrodes when the one or more transmitter electrodes are driven for input sensing.

2. The processing system of claim 1, wherein the driver module is further coupled to a second set of registers configured for:
   receiving a token from a first set of registers;
   holding the token during the non-display update period; and
   passing the token to a third set of registers.

3. The processing system of claim 2, wherein the driver module is further coupled to the first set of registers and the third set of registers, wherein:
   the first set of registers is coupled to the first display line set and configured for:
      receiving the token;
      in response to receiving the token, selecting the first display line set for display updating during the first display update period; and
      passing the token to the second set of registers; and
   the third set of registers is coupled to the second display line set and configured for:
      receiving the token from the second set of registers; and
      in response to receiving the token, selecting the second display line set for display updating during the restart period.

4. The processing system of claim 1, wherein the driver module is further coupled to a delay logic unit configured for:
   receiving a token; and
   holding the token during the non-display update period.

5. The processing system of claim 4, where the delay logic unit is further configured for:
   during the non-display update period, receiving a recirculate signal; and
   in response to receiving the recirculate signal, holding the token.

6. The processing system of claim 4, wherein the driver module is further coupled to:
   a first set of registers coupled to the first display line set and configured for:
      receiving the token;
      in response to receiving the token, selecting the first display line set for display updating during the first display update period; and
      passing the token to the delay logic unit; and
   a second set of registers coupled to the second display line set and configured for:
      receiving the token from the delay logic unit; and
      in response to receiving the token, selecting the second display line set for display updating during the restart period.

7. The processing system of claim 1, wherein the driver module is further configured for driving a plurality of source drivers to a reference voltage during the restart period.

8. The processing system of claim 1, wherein the non-display update period is at least as long as the first display update period.

9. An input device comprising a display device having an integrated sensing device, the input device comprising:
   a plurality of transmitter electrodes, each transmitter electrode comprising one or more common electrodes of a plurality of common electrodes configured for display updating and input sensing;
   a plurality of receiver electrodes;
   a processing system coupled to the plurality of common electrodes and the plurality of receiver electrodes, the processing system configured to:
      select a first display line set for display updating during a first display update period of a first display frame;
      drive the first display line set for display updating during the first display update period;
      drive one or more transmitter electrodes of the plurality of transmitter electrodes for input sensing during a non-display update period, wherein the non-display update period occurs after the first display update period and before a second display update period of the first display frame;
      receive resulting signals with the plurality of receiver electrodes when the one or more transmitter electrodes are driven for input sensing; and
      select a second display line set for display updating during a restart period, and wherein one or more display line updates for the second display line set are skipped during at least a portion of the restart period.

10. The input device of claim 9, wherein the input device further comprises a second set of registers configured to:
    receive a token from a first set of registers;
    hold the token during the non-display update period; and
    pass the token to a third set of registers.

11. The input device of claim 10, wherein the input device further comprises:
   the first set of registers, wherein the first set of registers is coupled to the first display line set and configured to:
      receive the token;
      in response to receiving the token, select the first display line set for display updating during the first display update period; and
      pass the token to the second set of registers; and
   the third set of registers, wherein the third set of registers is coupled to the second display line set and configured to:
      receive the token from the second set of registers; and
      in response to receiving the token, select the second display line set for display updating during the restart period.

12. The input device of claim 11, wherein the first set of registers, the second set of registers, and the third set of registers are disposed on a thin-film transistor layer of the input device.

13. The input device of claim 10, wherein the input device further comprises a delay logic unit configured to:
   receive a token; and
   hold the token during the non-display update period.

14. The input device of claim 13, where the delay logic unit is further configured to:
   during the non-display update period, receive a recirculate signal; and
   in response to receiving the recirculate signal, hold the token.

15. The input device of claim 13, wherein the delay logic unit comprises a multiplexer, a logic gate, and a storage element.

16. The input device of claim 13, wherein the input device further comprises:
   a first set of registers coupled to the first display line set and configured to:
      receive the token;
      in response to receiving the token, select the first display line set for display updating during the first display update period; and
      pass the token to the delay logic unit; and
   a second set of registers coupled to the second display line set and configured to:
      receive the token from the delay logic unit; and
      in response to receiving the token, select the second display line set for display updating during the restart period.

17. A method of input sensing with a display device integrated with a sensing device having a plurality of receiver electrodes and a plurality of transmitter electrodes, each transmitter electrode comprising one or more common electrodes of a plurality of common electrodes, the method comprising:
   selecting a first display line set for display updating during a first display update period of a first display frame;
   driving the first display line set for display updating during the first display update period;
   driving one or more transmitter electrodes of the plurality of transmitter electrodes for input sensing during a non-display update period, wherein the non-display update period occurs after the first display update period and before a second display update period of the first display frame;
   receiving resulting signals with the plurality of receiver electrodes when the one or more transmitter electrodes are driven for input sensing; and
   selecting a second display line set for display updating during a restart period, wherein one or more display line updates for the second display line set are skipped during at least a portion of the restart period.

18. The method of claim 17, further comprising:
   receiving a token with a first set of registers;
   in response to receiving the token with the first set of registers, selecting the first display line set for display updating during the first display update period;
   passing the token from the first set of registers to a second set of registers;
   holding the token with the second set of registers during the non-display update period;
   following the non-display update period, passing the token to a third set of registers;
   receiving the token with the third set of registers; and
   in response to receiving the token with the third set of registers, selecting the second display line set for display updating during the restart period.

19. The method of claim 17, further comprising:
   receiving a token with a delay logic unit;
   receiving a recirculate signal with the delay logic unit;
   in response to receiving the recirculate signal, holding the token with the delay logic unit during the non-display update period; and
   following the non-display update period, passing the token.

20. The method of claim 19, further comprising:
   receiving the token with a first set of registers;
   in response to receiving the token with the first set of registers, selecting the first display line set for display updating during the first display update period;
   passing the token from the first set of registers to the delay logic unit;
   receiving the token from the delay logic unit with a second set of registers; and
   in response to receiving the token with the second set of registers, selecting the second display line set for display updating during the restart period.

* * * * *